(12) United States Patent
Shaw

(10) Patent No.: US 8,467,777 B2
(45) Date of Patent: *Jun. 18, 2013

(54) INTELLIGENT TEXT MESSAGE TO SPEECH SYSTEM AND METHOD FOR VISUAL VOICEMAIL

(71) Applicant: AT&T Intellectual Property I LP, Atlanta, GA (US)

(72) Inventor: Venson M. Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,478

(22) Filed: Nov. 16, 2012

(65) Prior Publication Data

US 2013/0072178 A1 Mar. 21, 2013

Related U.S. Application Data

(63) Continuation of application No. 12/796,290, filed on Jun. 8, 2010, now Pat. No. 8,355,703.

(51) Int. Cl.
*H04M 3/00* (2006.01)

(52) U.S. Cl.
USPC ...... 455/418; 455/413; 455/412.1; 455/412.2; 455/414.4; 455/466

(58) Field of Classification Search
USPC ................ 455/413, 412.1, 412.2, 418, 414.4, 455/466
See application file for complete search history.

(56) References Cited

U.S. PATENT DOCUMENTS

| | | |
|---|---|---|
| 2009/0141875 A1 | 6/2009 | Demmitt et al. |
| 2010/0035585 A1 | 2/2010 | Hadinata et al. |
| 2011/0300833 A1 | 12/2011 | Shaw |

*Primary Examiner* — Kathy Wang-Hurst
(74) *Attorney, Agent, or Firm* — Woodcock Washburn LLP

(57) ABSTRACT

A visual voicemail system can convert visual voicemail message content to an alternate format based on the location of the recipient device, whether and how the recipient device is in motion, a priority of the message content, user preferences, or other criteria. Alternately, a recipient wireless device may also convert content to an alternate format based on the similar criteria. Content may be presented automatically to a user on recipient device based on such criteria. Content may be converted from audio to text, text to audio, or from any format to any other format. Location, motion data, user preferences, etc. may be obtained from a location based service system, a recipient wireless device, or any other source.

20 Claims, 8 Drawing Sheets

INTELLIGENT TEXT MESSAGE TO SPEECH SYSTEM AND METHOD FOR VISUAL VOICEMAIL

CROSS-REFERENCE TO RELATED APPLICATIONS

This application is a continuation of, and claims priority to, U.S. patent application Ser. No. 12/796,290, filed Jun. 8, 2010, entitled "Intelligent Text Message-to-Speech System and Method for Visual Voice Mail" the entire contents of which are hereby incorporated herein by reference.

TECHNICAL FIELD

The technical field generally relates to wireless communications and more specifically relates to visual voicemail systems.

BACKGROUND

Communications devices such as cellular telephones, mobile communication devices, personal digital assistants (PDAs), laptops, and the like are becoming more prevalent as technology advances and makes these devices more powerful and more affordable. These devices are also being constructed with increasing capabilities and can now perform functions that have in the past been performed by dedicated special function communications devices. For instance, a common mobile communications device today may have computing capabilities that allow the device to process multimedia content, the ability to communicate with data networks such as the Internet, a display than can render high quality still images and video, audio capabilities that allow the device to play music and video soundtracks, as well as the ability to place and receive traditional mobile telephone calls and text messages.

The expanding capabilities of mobile communications devices have allowed the improvement and enhancement of more traditional technologies. For example, voicemail has traditionally been an audio-only feature that requires a telephone connection to a voicemail server. Traditionally, a user would receive a message waiting notification that a voicemail is available, and the user would then have to dial into a voicemail server to listen to the message. Thanks to technological advances, visual voicemail is available on many mobile communications devices. Visual voicemail presents a visual interface to a user's voicemail box and allows the user to view attributes of voicemail and manipulate voicemail in various ways that were previously not possible. A user may delete or save voicemail through the visual interface without having to place a telephone call to a voicemail server. A user may also be able to see who the voicemail is from, when it was sent or received, and other characteristic of the voicemail without actually placing a telephone call to a voicemail server. A user may also respond to a visual voicemail message with a reply visual voicemail, thus enabling two way communication through a visual voicemail system. Visual voicemail systems may also provide a means for a sender to include multimedia content to accompany a voice message or to be provided instead of a voice message.

With the increased use of mobile devices to access features such as visual voicemail has come an increase in distractions while performing everyday tasks, such as driving. Reading or composing text portions of a visual voicemail can be very dangerous if one is currently operating an automobile or performing another task that requires full attention. On the other hand, while sitting at home or at work, or while otherwise performing tasks that are not dangerous and/or do not require full attention, reading or viewing text or video portions of visual voicemail may be perfectly safe. What are needed in the art are systems and methods for improving the safety and functionality of visual voicemail presentation.

SUMMARY

In an embodiment, a visual voicemail system may receive visual voicemail message content for a visual voicemail message that is intended for a recipient wireless device. The visual voicemail system may determine that the content should be converted to an alternate format based on any of several criteria, including a priority of the content, a location of the recipient device, motion data of the recipient device, user preferences, etc. For example, the content may be text content of an urgent or high priority, and may be intended for a recipient device that is currently in a moving vehicle. Therefore, the visual voicemail system may determine that it is likely that the user of the recipient device is driving, and therefore the content should be presented to the user in audio format so that the user is not distracted from driving by trying to read an urgent message on the recipient device. The visual voicemail system may then convert the text content to audio content and transmit the audio content to the recipient device. In one embodiment, the visual voicemail system may also transmit an instruction to the recipient device to automatically present the audio content on receipt.

In an alternate embodiment, a visual voicemail client configured on a user's wireless device may perform similar functions. For example, the user's wireless device may receive visual voicemail message content and determine that the content should be converted to a different format based on any criteria, such as location or motion status of the wireless device, user preferences, priority, etc. The wireless device may then perform the conversion and present the content to the user. In one embodiment, the content may be automatically presented to the user based on certain criteria, for example, when the content is of an urgent or high priority.

Location or motion data may be received from a location based services system or any other network device. Alternatively, a wireless device may determine its own location or motion data using means such as GPS, motion detection component, etc. User preferences may be stored locally on a wireless device, on a visual voicemail system, or on some other network device. These and other aspects are described in more detail below and in the accompanying drawings.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
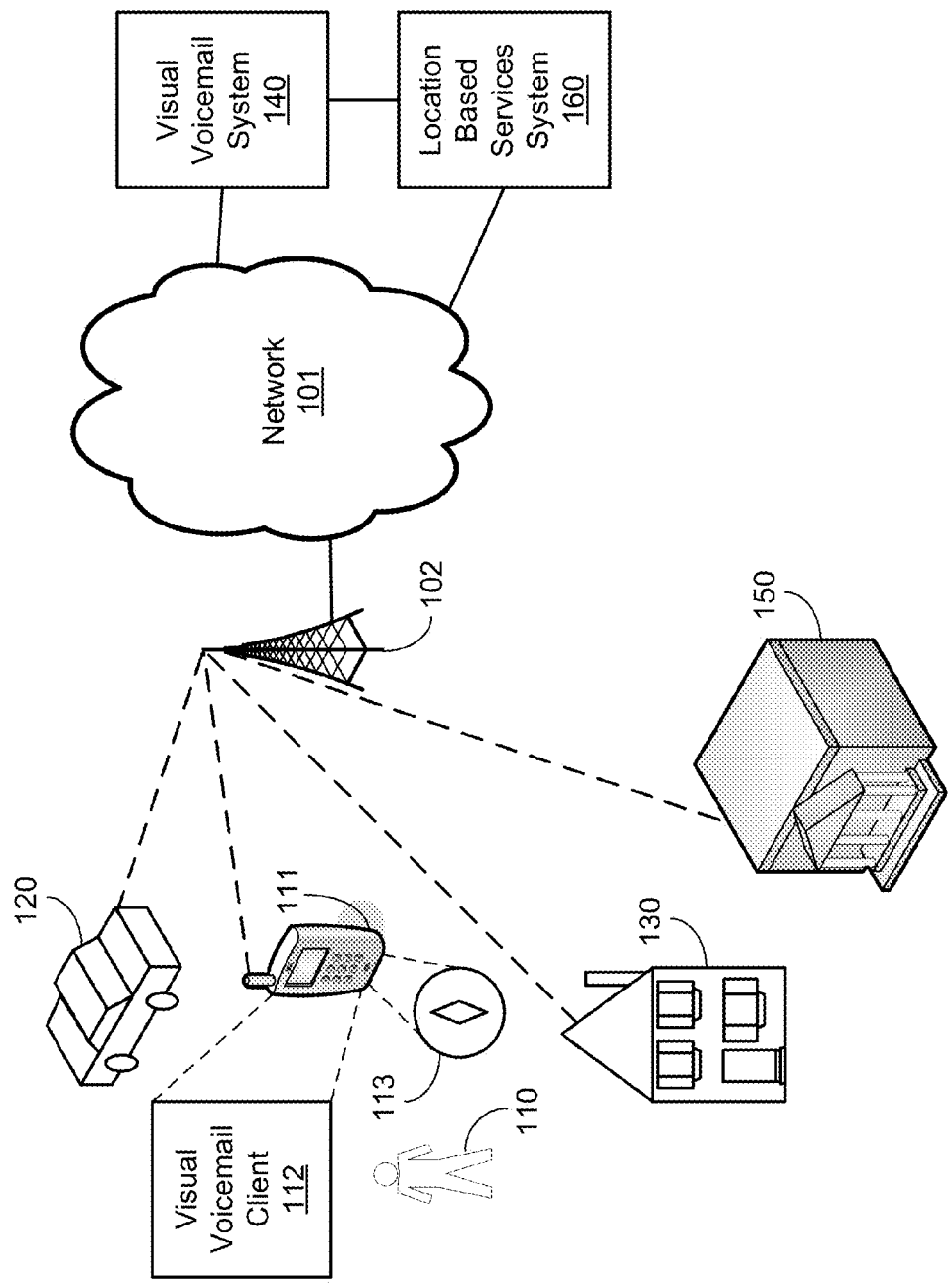
FIG. 1 illustrates a non-limiting exemplary environment in which systems and methods for intelligent content conversion for visual voicemail may be implemented.

FIG. 1 illustrates an environment in which one or more embodiments of the disclosed systems and methods for intelligent text message to speech methods and systems using visual voicemail may be implemented. User 110 may be operating wireless device 111 in any of a variety of areas and situations. For example, user 110 may be operating, or merely carrying or traveling with, wireless device 111 in vehicle 120, which may be any moving vehicle in which user 110 is a driver, operator, or passenger. Alternatively, user 110 may be operating, or merely carrying or proximate to, wireless device 111 in residence 130, which may be any residence. Residence 130 may also represent any building, workplace, or area where user 110 is not operating a vehicle. In another alternative, user 110 may be operating, or merely carrying or proximate to, wireless device 111 in residence 130, which may be any type of building, workplace, entertainment venue (e.g., a movie theater) or other area where user 110 is not operating a vehicle and/or where user 110 may wish to alter the presentation of visual voicemail content. In another alternative, user 110 may be walking, running, sitting, sleeping, or otherwise present in any area or any place, and may be operating or merely holding, carrying, or proximate to, wireless device 111.

Wireless device 111 may be any type of wireless mobile communications device, including a mobile telephone, smart phone, personal data assistant (PDA), mobile computer, wireless email device, or any combination thereof. Alternatively, while wireless device 111 as illustrated represents wireless mobile communications devices, wireless device 111 may also represent a wired device, such as a landline telephone, computer, email device, or any other communications device or any combination thereof. All such embodiments are contemplated as within the scope of the present disclosure.

Wireless device 111 may be configured to communicate with network 101 using any communications means. Network 101 may be any type of network capable of providing wireless and/or wired data and/or voice communications services to devices of any type. Network 101 represents any number of interconnected networks that may be composed of any number and type of wired and/or wireless network devices. Network 101 may enable wireless device 111 to communicate with other devices accessible via network 101, including visual voicemail system 140, locations based services system 160, web servers, and mobile communications devices such as cell phones and mobile computing devices. Such communication may be voice, data, or a combination thereof. All such embodiments are contemplated as within the scope of the present disclosure.

In one embodiment, wireless device 111 may be configured to access and/or communicate with visual voicemail system 140 and/or location based service system 160 via base station 102, which may be any type of base station, eNodeB, or other means for relaying wireless communications and converting data and/or voice messages between wireless and wired networks. Base station 102 may facilitate communication with network 101 for wireless device 111. User 110 may operate wireless device 111 to access his or her voicemail data using visual voicemail client 112 configured on wireless device 111. Visual voicemail client 112 may be software, hardware, or any combination thereof. Alternatively, visual voicemail client 112 may represent functionality that may be provided by a web server and accessed by user 110 through a web browser executing, for example, on wireless device 111. Any other permutation of combination of these embodiments, and any embodiments which provide similar functionality, are contemplated as within the scope of the present disclosure.

Location based service system 160 may be any type of system, device, or multiple devices that provides location based services. Location based service system 160 may determine the location of a wireless device, such as wireless device 111, in any manner. For example, location based service system 160 may be configured to determine a geographical location of wireless device 111 by using positioning or control plane technology where the radio signals of wireless device 111 are analyzed to determine location. Alternatively, location based service system 160 may be configured to implement GSM localization or otherwise determine the location of wireless device 111 in relation to a cell site, such as base station 102, through multilateration of the signals exchanged between wireless device 111 and base station 102 and the use of time difference of arrival (TDOA) or Enhanced Observed Time Difference (E-OTD) techniques. In another alternative, location based service system 160 may obtain global positioning system (GPS) coordinates for wireless device 111. Such coordinates may be obtained from wireless device 111 in embodiments where wireless device 111 is configured with GPS components. Such coordinates may also be obtained and/or determined from components within network 101, or through a combination of network 101 and wireless device 111 devices. Any location based services techniques or means may be used, and all such embodiments are contemplated as within the scope of the present disclosure.

Note that wireless device 111, location based service system 160, and/or both devices working in combination, may use location data to determine whether wireless device 111 is in motion. For example, by comparing two sets of location data that are obtained for wireless device 111 in a relatively short period of time, either or both of these devices may determine that wireless device 111 is in motion, and may also determine a direction, velocity, acceleration, and/or any other directional or location data for wireless device 111. In another embodiment, wireless device 111 may also be configured with motion detection component 113, which may be an accelerometer, gyroscope, optical, electrical, or mechanical motion detection means, any software configured for motion detection and the like, or any combination thereof. All such embodiments are contemplated as within the scope of the present disclosure.

A visual voicemail message may be sent to user 110 via visual voicemail system 140. The visual voicemail message may be received by visual voicemail client 112 and presented to user 110 on wireless device 111. The visual voicemail message may have content in any form or format, including text content, audio content, video content, image content, etc. The way in which some or all of the content of the visual voicemail message is presented to user 110 may be determined or adjusted based on location and related data for wireless device 111. For example, user 110 may be operating or otherwise carrying or traveling with wireless device 111 at various points in a journey (e.g., driving to work, traveling on vacation, etc.) At some points during the journey, while driving for instance, user 110 may not be able to safely view video, text, or image content of a visual voicemail message, but may be able to safely listen to audio content. At other points in a journey, silence may be important, while watching a movie in a movie theater for instance, but visual content of a visual voicemail message may be readily consumed. Various other situations may be presented to user 110 wherein certain forms of content may be readily consumed while other forms of content may not be desirably or safely consumed.

In one embodiment, visual voicemail messages, or content associated with visual voicemail messages, may have associated priority levels. For example, the highest priority level may be assigned to messages of greatest importance, such as those communicating a family emergency or urgent task that requires user 110's attention. The lowest priority level may be assigned to messages that are of little importance, such as advertisements or jokes sent from friends. One or more intermediate levels may be used to indicate messages with an importance somewhere between the greatest importance and the least importance. Any number of priority levels may be configured, and visual voicemail messages may be assigned priority levels using any means, including automatically by visual voicemail system 140, manually by user 110 as a recipient or sender of a visual voicemail message, or automatically by visual voicemail client 112. In embodiments where a visual voicemail client assigns a priority level to a visual voicemail message, the client may be preconfigured to assign priority levels or may be configured by user 110 to assign priority levels based on criteria provided by user 110. Any embodiment where priority levels are used in any way, or not used at all, is contemplated as within the scope of the present disclosure.

In one embodiment, a visual voicemail message comprising text content may be transmitted to wireless device 111 for presentation to user 110. Visual voicemail system 140 may receive the incoming visual voicemail message, and may, prior to transmitting the visual voicemail message via network 101 to wireless device 111, determine a location and/or current motion status for wireless device 111. In an embodiment, location and/or motion status may be determined via communication with location based services system 160. Thus, visual voicemail system 140 may query location based services system 160 for a current location and/or motion status and may receive a response with such status from location based services system 160.

Upon receiving location and/or motion data from location based services system 160, visual voicemail system 140 may determine that the visual voicemail message contains text content, and may determine the priority of the visual voicemail message, if any. Visual voicemail system 140 may then determine whether text content of the visual voicemail message should be converted to audio content based on the motion and/or location data and in some embodiments the priority of the visual voicemail message or the priority of the text content of the visual voicemail message. In an embodiment, the visual voicemail message may include a text portion and the location and/or motion data indicates that user 110 is in an area or performing an activity where reading text on wireless device 111 may be unsafe or undesirable, visual voicemail system 140 may automatically convert the text portion to an audio file or data segment, and transmit the audio file or segment with the visual voicemail message to wireless device 111 for presentation to user 110 via visual voicemail client 112.

For example, user 110 may be driving vehicle 120. Location and/or motion data may be used to determine that user 110 is traveling at several 10s of miles an hour and thus visual voicemail system 140 may determine that is may be unsafe for user 110 to read a text message at the present time. Therefore, visual voicemail system 140 may convert the text portion of the message to an audio file and transmit the audio file with the visual voicemail message to wireless device 111. Visual voicemail client 112 may automatically present the audio portion to user 110 by executing the audio file upon receipt. This configuration may be especially desirable for emergency messages or any communication that should be received by user 110 as soon as possible. Alternatively, user 110 may be presented with an interface to initiate execution of the audio file upon activation of a control. Any other means of presenting an audio portion of a message may be used, and all such embodiments are contemplated as within the scope of the present disclosure.

Alternative conversions may also be used depending on the situation. For example, in one embodiment, visual voicemail system 140 may convert audio portions of a visual voicemail message to text. User 110 may be attending a movie in building 150, where audio message presentation may be undesirable. Visual voicemail system 140 may determine that user 110, or, more specifically, wireless device 111, is in a location where audio messaging is undesirable based on a location of wireless device 111 obtained from location based services system 160. Thus, visual voicemail system 140 may transcribe an audio portion of a visual voicemail message intended for user 110 to text, and transmit the text portion with the visual voicemail message to wireless device 111. Alternatively, the same process may occur if wireless device 111's location is determined to be at residence 130 or any other location where silence may be desired. Note that such locations may be configured by user 110 using visual voicemail client 112 or any other interface that may allow user 110 to configure visual voicemail preferences that may be communicated to visual voicemail system 140.

In alternate embodiment, the conversion and transcription functions described herein may be performed locally on wireless device 111. Upon receipt of a visual voicemail message, wireless device 111 may determine its own location and/or motion status by communicating with location based services system 160 and/or visual voicemail system 140. Alternatively, wireless device 111 may determine its own location using local resources, such as local GPS data and/or motion data obtained via motion detection component 113. Based on the determined location and/or motion data, visual voicemail client 112, or another software and/or hardware component of wireless device 111, may determine that a portion of the received visual voicemail message should be transcribed or converted to another format, and may then do so.

For example, user 110 may be sleeping in residence 130. Location and/or motion data may be used by visual voicemail client 112 to determine that user 110 is at a location at which user 110 does not wish to be audibly disturbed. Therefore, visual voicemail client 112 may convert an audio portion of a visual voicemail message to text present the text via visual voicemail client 112 on wireless device 111. Alternatively, visual voicemail client 112 may receive an urgent or highest priority visual voicemail message that includes text content and determine that user 110 is in a location where user 110 is unlikely to see the message. Visual voicemail client 112 may automatically convert the text portion of the visual voicemail message to an audio file or segment and present the audio portion to user 110 by executing the audio file. This configuration may be especially desirable for emergency messages or any communication that should be received by user 110 as soon as possible. Alternatively, user 110 may be presented with an interface to initiate execution of the audio file upon activation of a control. Any other means of presenting an audio portion of a message may be used, and all such embodiments are contemplated as within the scope of the present disclosure.

In another example, user 110 may be riding a bicycle outdoors. Motion data may be obtained by visual voicemail client 112 and a determination may be made the user 110 is in motion and unlikely to be able to safely read a text portion of an urgent visual voicemail. Visual voicemail client 112 may therefore convert the text portion to an audio file and present the audio portion to user 110 by executing the audio file. This configuration may be especially desirable for emergency messages or any communication that should be received by user 110 as soon as possible. Alternatively, user 110 may be presented with an interface to initiate execution of the audio file upon activation of a control. Any other means of presenting an audio portion of a message may be used, and all such embodiments are contemplated as within the scope of the present disclosure.

Note that transcriptions and conversions of content may be based on user preferences instead of, or in conjunction with, determination of user device locations or motion. For example, user 110 may configure wireless device 111 and/or visual voicemail client 112 to convert all text portions of visual voicemail messages to audio, or transcribe all audio to text, etc. Alternatively, user 110 may configure wireless device 111 and/or visual voicemail client 112 to convert certain messages or content to alternate formats. For example, user 110 may configure wireless device 111 and/or visual voicemail client 112 to convert all text content from specified senders to audio content, all audio content from specified senders to text, etc. Alternatively, user 110 may configure wireless device 111 and/or visual voicemail client 112 to perform format conversions on content of visual voicemail messages during a specified time of day, or days of the week etc. In another alternatively, user 110 may configure wireless device 111 and/or visual voicemail client 112 to convert only text portions of the highest priority messages to audio, or convert all audio portions of the lowest priority messages to text, etc. Any user preferences may be configured to take effect only during certain time periods, and any number of time periods may configured with any user preferences. Note that user preferences may be stored locally, on wireless device 111, or remotely, on visual voicemail system 140, on both systems, or anywhere else that such preferences may be accessible by devices and programs that need them.

Note that these configurations may be performed in conjunction with location and/or motion data. For example, user 110 may configure wireless device 111 and/or visual voicemail client 112 to convert all audio content to text during business hours when user 110, or more specifically, wireless device 111, is at or proximate to user 110's workplace. Any combination of user preferences and location/motion data may be used and all such embodiments are contemplated as within the scope of the present disclosure.

In some embodiments, location and/or motion data may be stored for future use and in the event that more current location and/or motion data becomes unavailable. For example, location and or motion data may be obtained by wireless device 111, visual voicemail system 140, or both and used to determine whether and how a visual voicemail message should be converted. At a later time, another visual voicemail message may be received, but current location and/or motion data may be unavailable, for instance when wireless device 111 is underground or out of range of GPS satellites or such functionality is otherwise disabled. In such an embodiment, wireless device 111 and/or visual voicemail system 140 may use the last known location and/or motion data to determine whether and how the content of the most recently received visual voicemail message may be converted for presentation to user 110.

Alternatively, user 110 may configure wireless device 111, visual voicemail system 140, or both with default preferences for content conversions that may be used to determine whether and how the content of a visual voicemail message should be converted in the event that location and/or motion data is unavailable. In another alternatively, wireless device 111, visual voicemail system 140, or both may be configured with default settings that are not user configurable that may be used to determine whether and how the content of a visual voicemail message should be converted in the event that location and/or motion data is unavailable. All such embodiments are contemplated as within the scope of the present disclosure.

Figure 2:
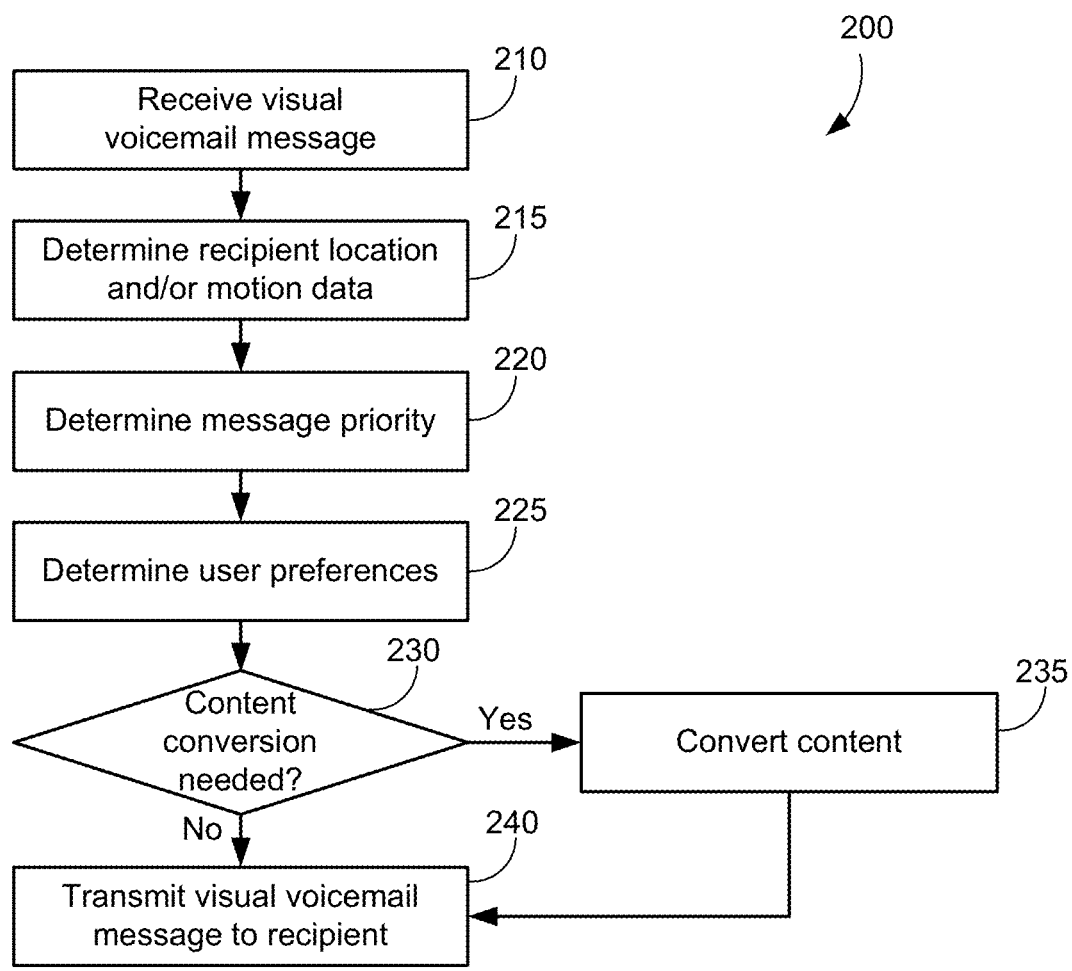
FIG. 2 illustrates a non-limiting exemplary method for implementing an intelligent content conversion for visual voicemail system.

FIG. 2 illustrates exemplary, non-limiting method 200 of implementing the disclosed subject matter. Note that one or more of the actions performed in method 200 may be performed without performing the other actions disclosed, and any combination of the actions disclosed in method 200 may be performed in any order. The actions of method 200 may be performed by one or more devices operating separately or in combination. The actions of method 200 may be embodied in instructions contained on computer-readable media, including non-transitory media such as computer-readable disks, memory, other computer-readable storage devices, etc.

At block 210, a visual voicemail system may receive a visual voicemail message, or content intended to be transmitted within a visual voicemail message. At block 215, the visual voicemail system may determine location data and/or motion data for the recipient device. This may include determining, as described above, whether the recipient device is in a moving vehicle, in an area where silence is desired, etc. using a location based services system, data from a user device, or any other means or combination of means. At block 220 a visual voicemail message priority may be determined Note that a priority scheme need not be implemented, but may be included in some embodiments. At block 225, user preferences may be determined. Here again, user preferences may or may not be present or user-configurable in every embodiment.

At block 230, a determination may be made as to whether any portion of the visual voicemail message intended for the recipient should be converted to another format. This determination may be based on any or all of the data gathered or otherwise determined at blocks 215, 220, and 225. For example, the visual voicemail message may have an associated high or urgent priority, may include text content intended for a user device that is currently with a user who is likely driving a vehicle, may be a message that should have audio converted to text according to user preferences, etc. Any additional criteria that may be needed, such as current time, date, etc., may also be obtained and used at block 230. Any criteria may be used to determine whether any or portion or all of the content of a visual voicemail message may need to be converted to another format, and all such embodiments are contemplated as within the scope of the present disclosure.

If no content conversion is needed, at block 240 the visual voicemail message may be transmitted to a recipient device. If content conversion is needed according to the criteria evaluated at block 230, at block 235 any such conversion is performed. The result of the conversion may be a single visual voicemail message that includes the original content of the visual voicemail message supplemented with the converted content. Alternatively, some or all of the content of the visual voicemail message may be replaced with converted content. In another alternative, the converted content may be transmitted separately from the visual voicemail message, and the visual voicemail message may or may not be transmitted intact to the recipient. This aspect may also be based on user preferences or other configurations. After content conversion is complete, at block 240 the visual voicemail message may be transmitted to the recipient device.

Alternatively, at block 240 only a notification of a visual voicemail message may be transmitted to a recipient device, rather than the message itself, thus requiring that a user request the visual voicemail message for presentation. Such embodiments may reserve network resources for when the user actually will consume the message. Alternatively, a converted or non-converted portion of a visual voicemail message may be transmitted to a user device rather than just a notification or the entire visual voicemail message. For example, when a visual voicemail message contains urgent content that is converted to audio, the urgent audio content may be transmitted to the recipient device while the non-audio portion may be retained on a visual voicemail system for future acquisition by the recipient device upon user demand. I another embodiment, along with a notification or actual visual voicemail message content, an instruction may be transmitted to the recipient that the visual voicemail content, or a portion thereof, should be immediately presented to the user, for example when the portion of the visual voicemail content is assigned a high or urgent priority.

Figure 3:
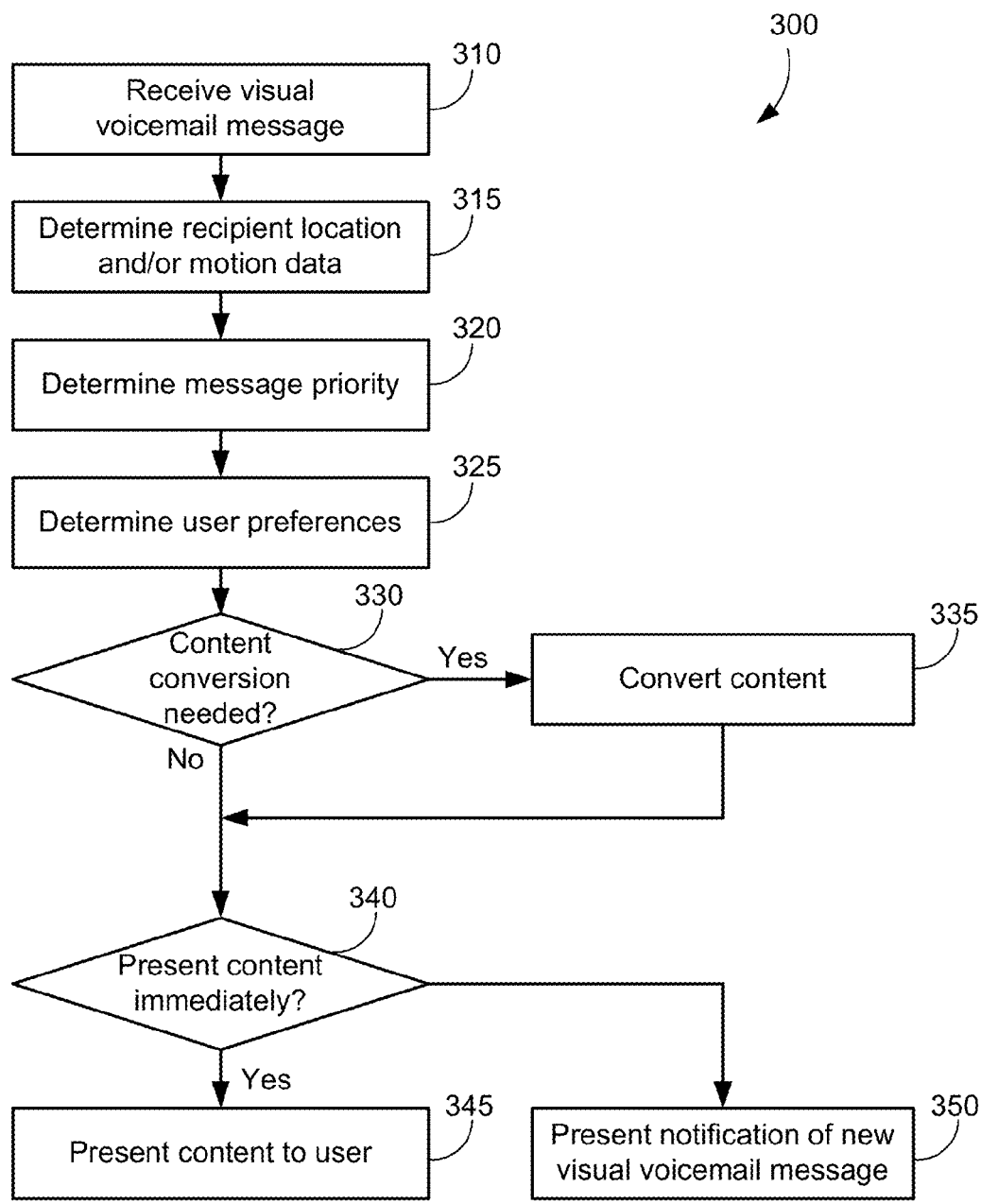
FIG. 3 illustrates another non-limiting exemplary method for implementing an intelligent content conversion for visual voicemail system.

FIG. 3 illustrates exemplary, non-limiting method 300 of implementing the disclosed subject matter. Note that one or more of the actions performed in method 300 may be performed without performing the other actions disclosed, and any combination of the actions disclosed in method 300 may be performed in any order. The actions of method 300 may be performed by one or more devices operating separately or in combination. The actions of method 300 may be embodied in instructions contained on computer-readable media, including non-transitory media such as computer-readable disks, memory, other computer-readable storage devices, etc.

At block 310, a wireless device and/or a visual voicemail client configured on a wireless device may receive a visual voicemail message, or content associated with a visual voicemail message. At block 315, the wireless device and/or the visual voicemail client may determine location data and/or motion data for the wireless device. This may include determining, as described above, whether the recipient device is in a moving vehicle, in an area where silence is desired, etc., using local means such as a motion detection device or GPS components and/or data, or using remote means, such as a location based services system that the wireless device may be configured to query for location and/or motion data. At block 320 a visual voicemail message priority may be determined for the received visual voicemail message. Note that a priority scheme need not be implemented, but may be included in some embodiments. At block 325, user preferences may be determined. Here again, user preferences may or may not be present or user-configurable in every embodiment. User preferences may be determined from locally stored user preferences that have been received by the wireless device and/or the visual voicemail client from the user, from remotely stored user preferences that may be stored at a visual voicemail system or other network device, or from any other device or means.

At block 330, a determination may be made as to whether any portion of the visual voicemail message should be converted to another format. This determination may be based on any or all of the data gathered or otherwise determined at blocks 315, 320, and 325. For example, the visual voicemail message may have an associated priority (high, low, urgent, etc.), may include audio content intended for a wireless device that is currently with a user who is in a silence-preferred area, may be text that should be converted to audio content during the current time of day according to user preferences, etc. Any additional criteria that may be needed, such as current time, date, etc., may also be obtained and used at block 330. Any criteria may be used to determine whether any or portion or all of the content of a visual voicemail message may need to be converted to another format, and all such embodiments are contemplated as within the scope of the present disclosure.

If content conversion is needed according to the criteria evaluated at block 330, at block 335 any such conversion is performed. The result of the conversion may be stored as a single visual voicemail message that includes the original content of the visual voicemail message supplemented with the converted content. Alternatively, some or all of the content of the visual voicemail message may be replaced with converted content and stored as a modified visual voicemail message on the wireless device. In another alternative, the converted content may be locally stored separate from the visual voicemail message. In other alternative, the visual voicemail message may not be stored locally, but may instead downloaded on demand from a visual voicemail system. This aspect may also be based on user preferences or other configurations. After content conversion is complete, at block 240 the visual voicemail message may be transmitted to the recipient device.

Regardless of whether content conversion is needed, at block 340 a determination may be made as to whether the content, or any portion thereof, should be immediately presented to the user of the wireless device. For example, if the received content or visual voicemail message includes an urgent audio portion that should be presented to a user immediately, at block 345 such content is immediately rendered for user consumption. If at block 340 it is determined that the content need not be immediately presented, then at block 350, a notification of a new available visual voicemail message may be presented to user, such as an icon, blinking light, etc.

The methods and systems described above provide ways to enhance visual voicemail systems by allowing automatic and seamless conversion of visual voicemail message content based on user location, motion, preferences, and other criteria. By implementing the present disclosure, the visual voicemail experience is improved due to improving the timeliness and effectiveness of visual voicemail communications. Set forth below are exemplary systems, devices, and components in which aspects of the present disclosure may be implemented.

Figure 4:
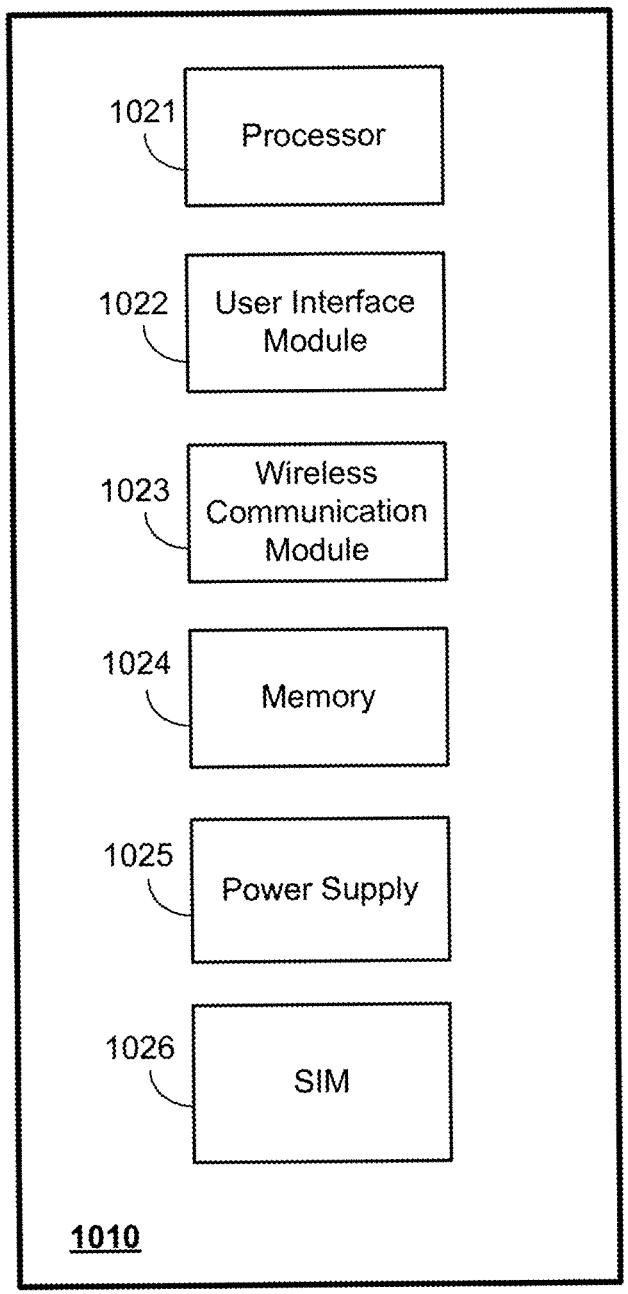
FIG. 4 is a block diagram of a non-limiting, exemplary wireless device that may be used in connection with systems and methods for intelligent content conversion for visual voicemail.

FIG. 4 illustrates an example wireless device 1010 that may be used in connection with an embodiment. References will also be made to other figures of the present disclosure as appropriate. For example, wireless device 111 may be a wireless device of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 executes software (e.g., computer-readable instructions stored in a computer-readable medium) that may include functionality related to systems and methods for intelligent content conversion for visual voicemail, for example. User interface module 1022 may be any type or combination of hardware and/or software that enables a user to operate and interact with wireless device 1010, and, in one embodiment, to interact with a system or software enabling the user to place, request, and/or receive calls, visual voicemail messages, visual voicemail notifications, visual voicemail content and/or data, and/or a system or software enabling the user to view, modify, or delete related software objects. For example, user interface module 1022 may include a display, physical and/or "soft" keys, voice recognition software, microphone, speaker and the like. Wireless communication module 1023 may be any type of transceiver including any combination of hardware and/or software that enables wireless device 1010 to communicate with wireless network equipment, for example, network 101, visual voicemail system 140, location based services system 160, or any other type of wireless communications network or network equipment. Memory 1024 enables wireless device 1010 to store information, such as visual voicemail notifications, visual voicemail client software, visual voicemail data and/or content, multimedia content, software to interact with visual voicemail systems and network devices, and visual voicemail preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 5:
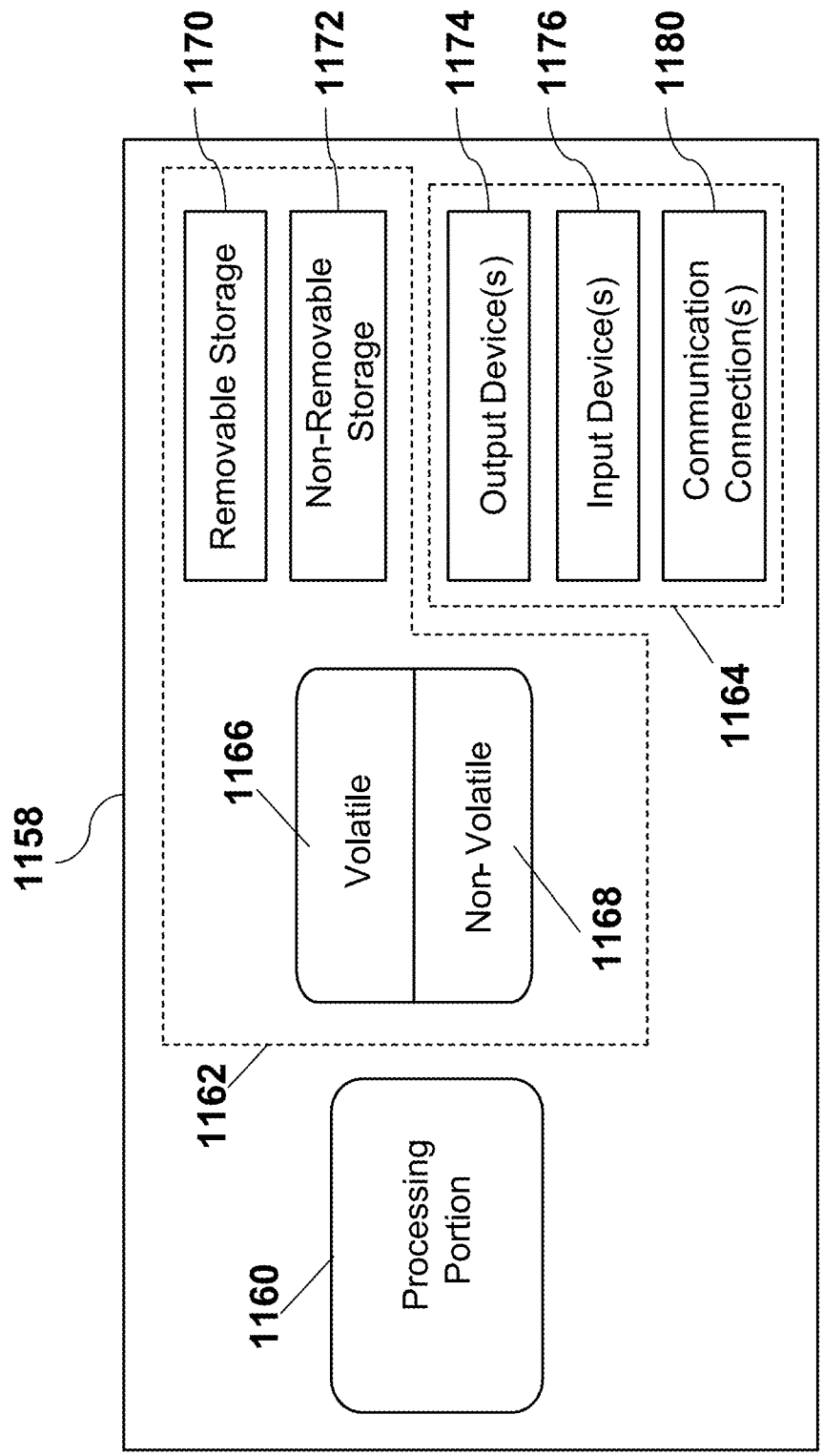
FIG. 5 is a block diagram of a non-limiting, exemplary processor in which systems and methods for intelligent content conversion for visual voicemail may be implemented.

FIG. 5 is a block diagram of an example processor 1158 which may be employed in any of the embodiments described herein, including as one or more components of wireless device 111, visual voicemail system 140, location based services system 160, base station 102, as one or more components of network equipment or related equipment, such as any component shown in FIG. 1, and/or as one or more components of any third party system or subsystem that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 5, the processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, establish and terminate visual voicemail data communications, transmit and receive visual voicemail notifications, credentials, requests for credentials, transmit, receive, store and process visual voicemail data and/or content, execute software to interact with visual voicemail systems and location based service systems, receive and store visual voicemail preferences and configurations, convert visual voicemail message content to alternate formats, and/or perform any other function described herein.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, converting, and/or processing visual voicemail, visual voicemail data and/or content, calls, other telephonic communications, etc. For example, the memory portion is capable of storing visual voicemail preferences, visual voicemail applications, visual voicemail credentials, visual voicemail content and converted content, and/or software capable of processing call requests, operating a visual voicemail client, receiving calls, processing visual voicemail and multimedia content, converting visual voicemail content to alternate formats, etc. Depending upon the exact configuration and type of processor, the memory portion 1162 may be volatile (such as RAM) 1166, non-volatile (such as ROM, flash memory, etc.) 1168, or a combination thereof. The processor 1158 may have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 may also contain the communications connection(s) 1180 that allow the processor 1158 to communicate with other devices, for example through network equipment as illustrated in FIGS. 1 and 3. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. Processor 1158 also may have input device(s) 1176 such as keyboard, keypad, mouse, pen, voice input device, touch input device, etc. Output device(s) 1174 such as a display, speakers, printer, etc. also may be included.

The network illustrated in FIG. 1 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how systems and methods for intelligent content conversion for visual voicemail may be implemented with stationary and non-stationary network structures and architectures in order to improve the visual voicemail user experience. It can be appreciated, however, that systems and methods for intelligent content conversion for visual voicemail such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE Advanced, etc., as well as to other network services. In this regard, the systems and methods for intelligent content conversion for visual voicemail may be applied independently of the method of data transport, and do not depend on any particular network architecture, or underlying protocols.

Figure 6:
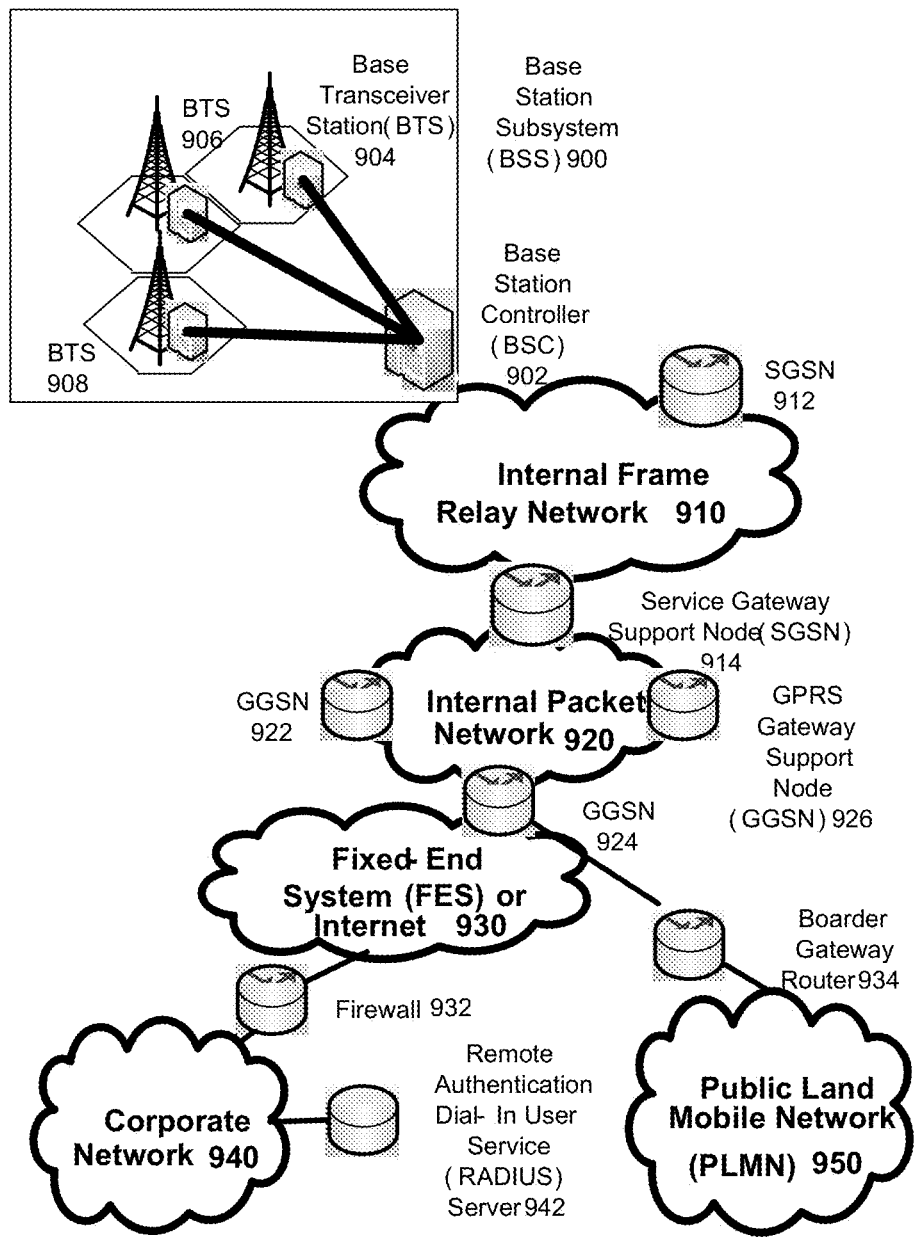
FIG. 6 is a block diagram of an exemplary packet-based mobile cellular network environment, such as a GPRS network, in which systems and methods for intelligent content conversion for visual voicemail may be implemented.

FIG. 6 depicts an overall block diagram of an exemplary packet-based mobile cellular network environment, such as a GPRS network, in which the systems and methods for intelligent content conversion for visual voicemail such as those described herein can be practiced. In an example configuration, network 101 as illustrated in FIG. 1 may be encompassed by or interact with the network environment depicted in FIG. 6. Similarly, wireless device 111 may communicate or interact with a network environment such as that depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless device 111) become connected to the wireless network. In exemplary fashion, the packet traffic originating from user devices (e.g., wireless device 111) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
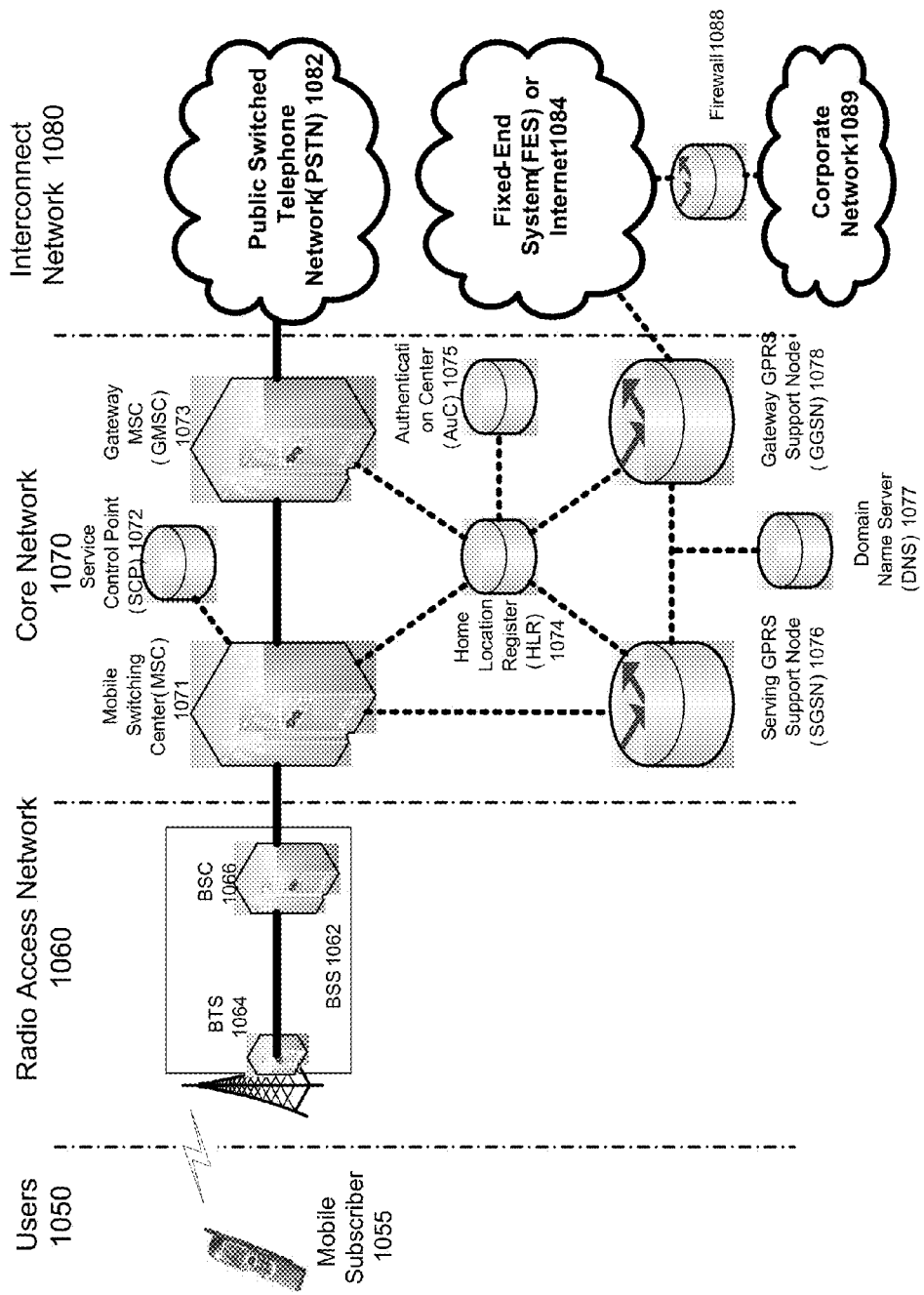
FIG. 7 illustrates a non-limiting, exemplary architecture of a typical GPRS network, segmented into four groups, in which systems and methods for intelligent content conversion for visual voicemail may be implemented.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise wireless device 111. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 may comprise Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, visual voicemail user preferences, and/or a key for authenticating the subscriber. HLR 1074 may also store dynamic subscriber information such as current or historic locations of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless device 111, used by an end user of a mobile cellular service or a wireless provider. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of systems and methods for intelligent content conversion for visual voicemail such as those described herein can include but are not limited to Gateway GPRS Support Node tables, Fixed End System router tables, firewall systems, VPN tunnels, and any number of other network elements as required by the particular digital network.

Figure 8:
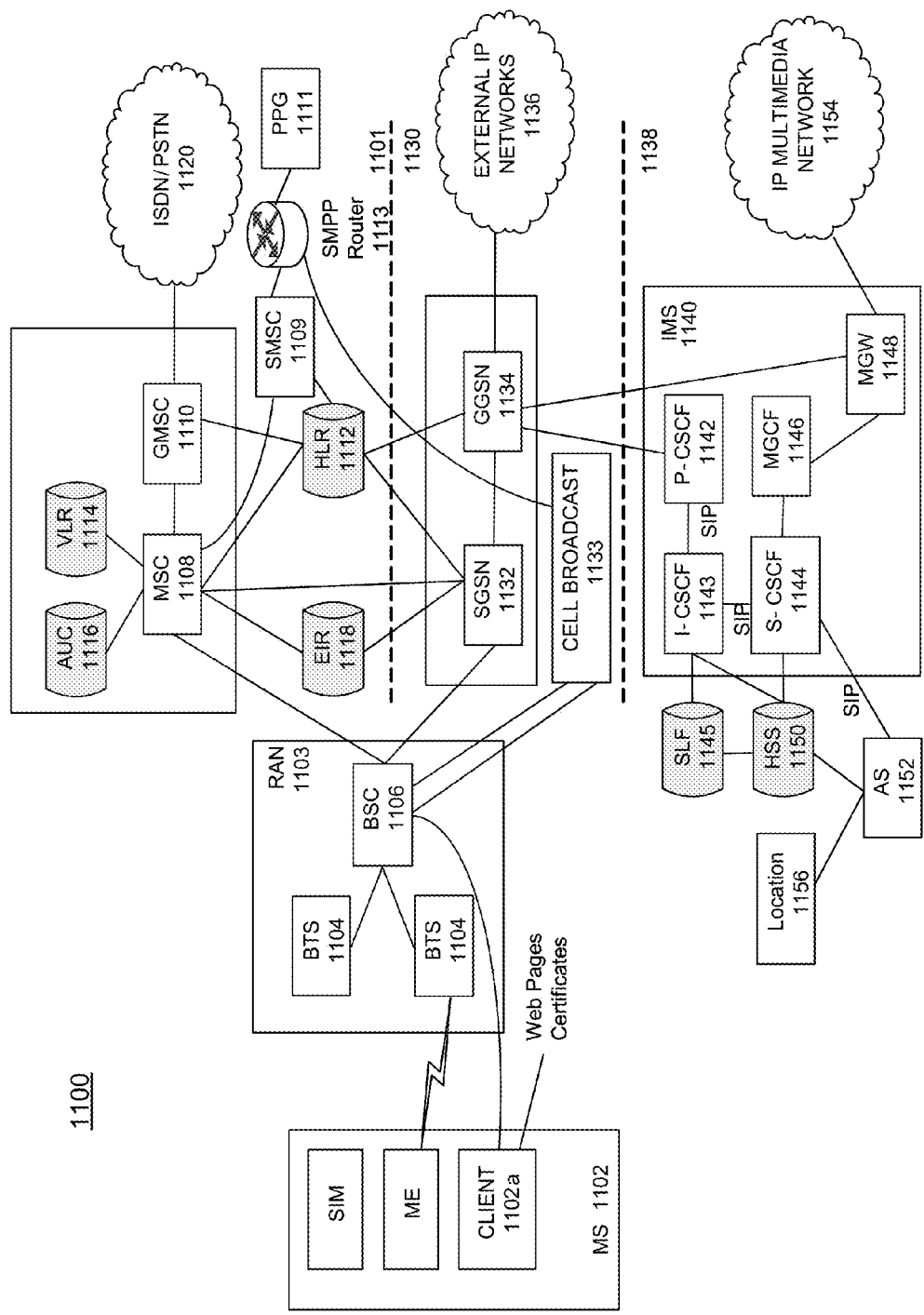
FIG. 8 illustrates a non-limiting alternate block diagram of an exemplary GSM/GPRS/IP multimedia network architecture in which systems and methods for intelligent content conversion for visual voicemail may be implemented.

FIG. 8 illustrates another exemplary block diagram view of a GSM/GPRS/IP multimedia network architecture 1100 in which the systems and methods for intelligent content conversion for visual voicemail such as those described herein can be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless device 111) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that contains administrative information regarding each subscriber registered in a corresponding GSM network. The HLR 1112 may also contain current or historical location data for each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as the Internet, or to any other external network, such as an X.25 network. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function may provide information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of systems and methods for intelligent content conversion for visual voicemail have been described in connection with various communications devices and computing devices/processors, the underlying concepts can be applied to any communications or computing device, processor, or system capable of implementing the systems and methods described. The various techniques described herein can be implemented in connection with hardware or software or, where appropriate, with a combination of both. Thus, the systems and methods for intelligent content conversion for visual voicemail, or certain aspects or portions thereof, can take the form of program code (i.e., instructions) embodied in tangible, non-transitory media, such as floppy diskettes, CD-ROMs, hard drives, or any other machine-readable storage medium, wherein, when the program code is loaded into and executed by a machine, such as a computer, the machine becomes an apparatus for an interactive personalized e-Experience system. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Systems and methods for intelligent content conversion for visual voicemail can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for intelligent content conversion for visual voicemail. When implemented on a general-purpose processor, the program code combines with the processor to provide a unique apparatus that operates to invoke the functionality of an intelligent content conversion for visual voicemail system as described herein. Additionally, any storage techniques used in connection with a visual voicemail system can invariably be a combination of hardware and software.

While systems and methods for intelligent content conversion for visual voicemail have been described in connection with the various embodiments of the various figures, it is to be understood that other similar embodiments can be used or modifications and additions can be made to the described embodiments for performing the same function of providing an intelligent content conversion for visual voicemail system without deviating therefrom. For example, one skilled in the art will recognize that systems and methods for intelligent content conversion for visual voicemail as described in the present application may apply to any environment, whether wired or wireless, and may be applied to any number of such devices connected via a communications network and interacting across the network. Therefore, systems and methods for intelligent content conversion for visual voicemail should not be limited to any single embodiment, but rather should be construed in breadth and scope in accordance with the appended claims.

What is claimed is:

1. A method comprising:
  receiving, from a recipient wireless device, data comprising a speed of motion of the recipient wireless device and a location of the recipient wireless device;
  determining that the speed of motion of the recipient wireless device exceeds a threshold;
  responsive to determining that the speed of motion of the recipient wireless device exceeds the threshold:
    determining a priority of first visual voicemail message content in a first format;
    determining a second format based on the priority of the first visual voicemail message content and the location of the recipient wireless device; and
    converting the first visual voicemail message content in the first format to second visual voicemail message content in the second format; and
  transmitting the second visual voicemail message content to the recipient wireless device.

2. The method of claim 1, wherein receiving the data comprises obtaining motion data from a motion detection component configured on the recipient wireless device.

3. The method of claim 1, further comprising transmitting an instruction to immediately present the second visual voicemail message content on the recipient wireless device.

4. The method of claim 1, further comprising determining a user preference, wherein determining the second format comprises determining the second format based on the user preference, the priority of the first visual voicemail message content, and the location of the recipient wireless device.

5. The method of claim 1, wherein receiving the data comprises obtaining location data from a global positioning system component configured on the recipient wireless device.

6. The method of claim 1, wherein the first format is a text format and the second format is an audio format.

7. The method of claim 1, wherein receiving the data comprises receiving at least two sets of location data for the recipient wireless device and comparing the at least two sets of location data.

8. A network device comprising:
  a memory comprising instructions; and
  a processor coupled to the memory that, when executing the instructions, effectuates operations comprising:
    receiving, from a recipient wireless device, data comprising a speed of motion of the recipient wireless device and a location of the recipient wireless device;

determining that the speed of motion of the recipient wireless device exceeds a threshold;
responsive to determining that the speed of motion of the recipient wireless device exceeds the threshold:
  determining a priority of first visual voicemail message content in a first format;
  determining a second format based on the priority of the first visual voicemail message content and the location of the recipient wireless device; and
  converting the first visual voicemail message content in the first format to second visual voicemail message content in the second format; and
transmitting the second visual voicemail message content to the recipient wireless device.

9. The network device of claim 8, wherein the operation of receiving the data comprises obtaining motion data from a motion detection component configured on the recipient wireless device.

10. The network device of claim 8, wherein the operations further comprise transmitting an instruction to immediately present the second visual voicemail message content on the recipient wireless device.

11. The network device of claim 8, wherein the operations further comprise determining a user preference, wherein the operation of determining the second format comprises determining the second format based on the user preference, the priority of the first visual voicemail message content, and the location of the recipient wireless device.

12. The network device of claim 8, wherein the operation of receiving the data comprises obtaining location data from a global positioning system component configured on the recipient wireless device.

13. The network device of claim 8, wherein the first format is a text format and the second format is an audio format.

14. The network device of claim 8, wherein the operation of receiving the data comprises receiving at least two sets of location data for the recipient wireless device and comparing the at least two sets of location data.

15. A computer-readable storage medium that is not a transient signal, the computer-readable storage medium comprising computer-executable instructions, which when executed by a processor, cause the processor to perform operations comprising:
  receiving, from a recipient wireless device, data comprising a speed of motion of the recipient wireless device and a location of the recipient wireless device;
  determining that the speed of motion of the recipient wireless device exceeds a threshold;
  responsive to determining that the speed of motion of the recipient wireless device exceeds the threshold:
    determining a priority of first visual voicemail message content in a first format;
    determining a second format based on the priority of the first visual voicemail message content and the location of the recipient wireless device; and
    converting the first visual voicemail message content in the first format to second visual voicemail message content in the second format; and
  transmitting the second visual voicemail message content to the recipient wireless device.

16. The computer-readable storage medium of claim 15, wherein the operation of receiving the data comprises obtaining motion data from a motion detection component configured on the recipient wireless device.

17. The computer-readable storage medium of claim 15, further comprising the operation of transmitting an instruction to immediately present the second visual voicemail message content on the recipient wireless device.

18. The computer-readable storage medium of claim 15, further comprising the operation of determining a user preference, wherein the operation of determining the second format comprises determining the second format based on the user preference, the priority of the first visual voicemail message content, and the location of the recipient wireless device.

19. The computer-readable storage medium of claim 15, wherein the operation of receiving the data comprises obtaining location data from a global positioning system component configured on the recipient wireless device.

20. The computer-readable storage medium of claim 15, wherein the operation of receiving the data comprises receiving at least two sets of location data for the recipient wireless device and comparing the at least two sets of location data.

* * * * *